United States Patent Office 3,470,670
Patented Oct. 7, 1969

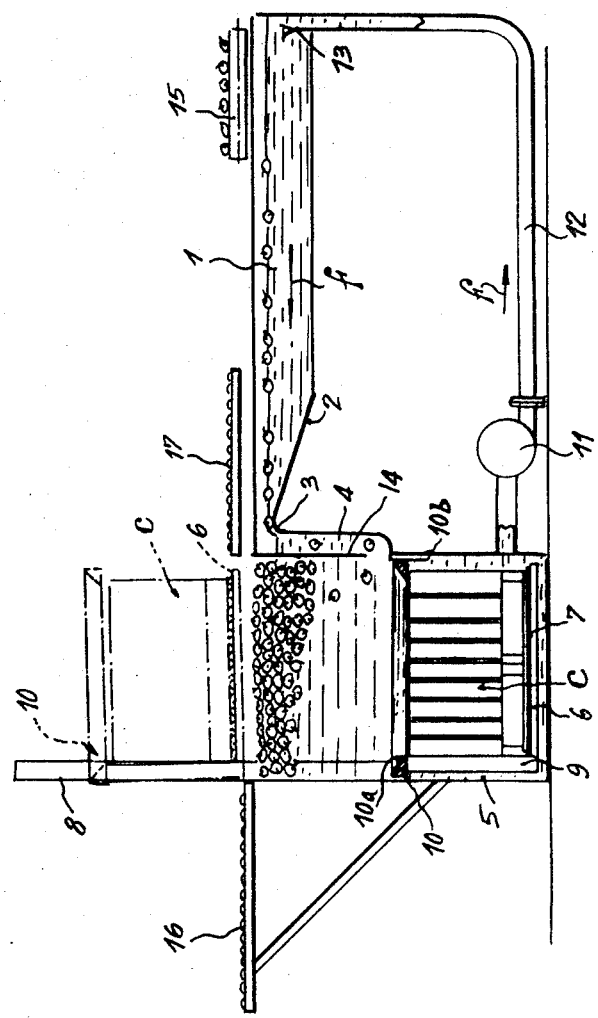

3,470,670
METHOD OF AND APPARATUS FOR FILLING CASES WITH FRUIT WHICH CAN BE FLOATED
Pierre Marcel Gaston Gorin, Route de Lalinde, Bergerac, Dordogne, France
Filed May 11, 1967, Ser. No. 637,715
Claims priority, application France, May 13, 1966, 61,628
Int. Cl. B65b 1/04
U.S. Cl. 53—35    12 Claims

ABSTRACT OF THE DISCLOSURE

A method of and apparatus for filling cases with fruit which can be floated, which consist of producing in a tank a buoyant ascent of the fruit above a lifting device momentarily immersed in said tank and carrying the case to be filled, whereby the movement of the lifting apparatus, and therefore of the case which it carries, out of the water is accompanied by the filling of said case with fruit.

---

The present invention has for its object a method and a machine for filling cases with fruit which can be floated.

This filling operation is preferably contemplated after the sorting and calibration of the fruit, in order to store it in cold chambers awaiting packing and dispatch.

The cases are for example of the openwork type of wood, having a square perimeter, known by the name of "Palox."

The method according to the invention consists of producing a buoyant ascent of the fruit in a tank, above a lifting device which is momentarily immersed and carries the case to be filled, the upward movement of the lifting device and the case out of the water resulting in the filling of the case with fruit.

The machine for carrying this method into effect is essentially characterized in that it comprises:

A water tank having preferably a perimeter corresponding substantially to that of the case to be filled;

A lifting device capable of being moved into and out of the tank;

A closed water-circulation circuit, comprising a pump;

A trough for conveying the floating fruit;

A hydraulic accelerator which precipates the fruit into a lower intake formed in the tank; and A gate-valve closing the said intake during the movement of the lifting device and the case which it carries out of the water, without preventing the circulation of water.

Other characteristic features and advantages of the present invention will be brought out in the description which follows below, reference being made to the accompanying drawing, the single figure of which is a diagrammatic view of a filling machine in accordance with the invention.

In the form of embodiment shown, the filling machine according to the invention comprises a channel or trough 1 terminating on the downstream side in a mouth 2 having a rounded overflow-chute 3, which communicates by a channel 4 having a width equal to that of the trough 1, with a water-tank 5 having a quadrangular and preferably a square section.

Inside the tank is disposed, with a clearance, a lifting fork 6, on the two arms of which is permanently mounted a roller conveyor 7. The lifting fork can move along two vertical slides 8.

On the vertical standards 9 of the lifting-fork is fixed a quadrangular and preferably square hopper 10, the opening 10a of which corresponds to the internal perimeter of the openwork case C which is to be filled with fruit, and which rests on the conveyor 7 of the lifting fork 6.

The hopper 10 is mounted above the case.

A gate-valve 10b is adapted to close the orifice which forms the communication between the channel 4 and the tank 5.

A pump 11 having a suitable output takes the water contained in the tank 5 and delivers it through a pipe 12 into the trough 1. The pipe 12 is terminated by a diffuser 13, the width of which is equal to that of the trough 1. A continuous movement of water at variable speed can thus be created in the direction of the arrow $f$ in the circuit: pump 11, piping 12, trough 1, channel 4 and tank 5.

The base of the partition 14 which separates the channel 4 from the tank is perforated with holes of predetermined number and section, so that the flow of water in the direction $f$ is not in any way checked when the gate-valve 10b is closed.

The machine according to the invention operates in the following manner:

The fruit, of the same caliber and taken from a calibrating device, is conveyed by a hydraulic or mechanical conveyor 15 and is transferred, without bruising, into the trough 1 filled with water in motion.

The fruit is then carried towards the overflow 3 (arrow $f$) at a speed which increases in the inverse ratio of the sections of the channel, until it reaches the overflow 3. The fruit is thus precipitated into the channel 4, and passes into the tank 5, in which it accumulates at the upper part of this latter. Due to this accumulation, a rise in the water level takes place in the tank 5.

When the volume of accumulated fruit corresponds to that of the case C which is to be filled, a float (not shown) actuates an electric contact which initiates the upward movement of the fork 6, by means of an appropriate electro-mechanical device, of the chain or rack type or comprising any other driving means (this device has not been shown in order to simplify the drawing).

During the upward movement of the fork, the case which it carries becomes filled with fruit, guided by the hopper 10, up to the moment when the fork and the case pass out of the water and come to rest in the position shown in chain-dotted lines, by the rapid break of a contactor of the electric circuit.

During its upward movement, the fork has carried with it the gate-valve 10b so that the latter can close the communicating orifice between the channel 4 and the tank 5 and thereby momentarily stops the passage of the fruit. The water however continues to circulate by passing through the perforations formed in the base of the partition 14.

The case filled with fruit can be transferred from the conveyor 7 on the fork to an evacuation roller conveyor 16 located at the same level, so that the fork 6 is then freed and ready to receive an empty case for a fresh filling operation. The empty cases are supplied from a roller conveyor 17 which is also located at the same level as the conveyor 7 of the fork.

The fork carrying a fresh empty case can then be automatically immersed in the tank 5 down to the position shown in full lines. The hopper 10 suitably holds the case if the latter has a tendency to float.

During the course of this immersion, the hopper 10 of the fork effects, as it passes, the downward movement of the gate-valve 10b and thereby opens the communication orifice between the channel 4 and the tank 5. The fruit then again passes into the tank and the cycle begins again.

The above description has generally only been given by way of indication and not in any limitative sense, and the invention is capable of receiving numerous modifications in conformity with its scope.

I claim:

1. A method of automatic filling of cases with fruit capable of being floated, which consists of producing in a tank a buoyant ascent of the fruit above a lifting device momentarily immersed in said tank and carrying the case to be filled, whereby the movement of the lifting apparatus, and therefore of the case which it carries, out of the water is accompanied by the filling of said case with fruit.

2. A method of filling as claimed in claim 1, in which the buoyant ascent of the fruit is effected through an inlet located as low as possible below the normal level of the tank, so as to permit, by passing by the bottom, an accumulation of the fruit at the upper part of the tank.

3. A method of filling as claimed in claim 1, in which a hydraulic accelerator is provided on the travel of the fruit upstream of the tank.

4. A method of filling as claimed in claim 1, in which a continuous circulation of water at variable speed is provided.

5. A machine for the automatic filling of cases with fruit which can be floated, comprising:
 a water tank;
 a lifting device adapted to receive the case to be filled;
 means for displacing said lifting device alternately into and out of the tank;
 a closed water-circulation circuit comprising a pump;
 a conveyor trough for the floating fruit;
 a lower inlet formed in the tank;
 a hydraulic accelerator precipitating the fruit into the lower inlet of the tank; and
 a gate-valve closing said inlet during the upward movement out of the water of the lifting device and the case which becomes filled with fruit.

6. A filling machine as claimed in claim 5, in which a channel couples said conveyor trough and the lower inlet.

7. A filling machine as claimed in claim 5, in which the hydraulic accelerator comprises an overflow-chute and a mouth disposed between said overflow and the conveyor trough.

8. A filling machine as claimed in claim 5, and further comprising an evacuation conveyor for the filled case and a supply conveyor for the fresh empty case.

9. A filling machine as claimed in claim 5, in which said lifting device is provided with rollers on which the case rests.

10. A filling machine as claimed in claim 5, in which a hopper forms part of said lifting device so as to guide the fruit into the case at the time of the upward movement of said lifting device.

11. A filling machine as claimed in claim 5, and further comprising:
 a float; and
 an electric contactor actuated by said float; in order to start the upward travel of the lifting device and the case carried by said device when the volume of fruit accumulated at the upper part of the tank corresponds to that of the case.

12. A filling machine as claimed in claim 11, and further comprising a second electric contactor for stopping the lifting device and the case filled with fruit when the lifting device and case assembly has passed completely out of the water.

References Cited

UNITED STATES PATENTS

| | | | |
|---|---|---|---|
| 1,507,864 | 9/1924 | Smith | 99–71 |
| 1,744,363 | 1/1930 | Chapman | 214–309 |
| 2,647,670 | 8/1953 | Cox | 53–245 X |
| 3,178,867 | 4/1965 | Martin | 53–248 |

FOREIGN PATENTS

| | | |
|---|---|---|
| 1,438,333 | 4/1966 | France. |

THERON E. CONDON, Primary Examiner

R. L. SPRUILL, Assistant Examiner

U.S. Cl. X.R.

53—235, 248